US011865849B2

(12) United States Patent
Fukasawa et al.

(10) Patent No.: US 11,865,849 B2
(45) Date of Patent: Jan. 9, 2024

(54) PRINTER

(71) Applicant: Seiko Epson Corporation, Tokyo (JP)

(72) Inventors: Koki Fukasawa, Shiojiri (JP); Hiroyuki Kobayashi, Suwa (JP); Tomosuke Gomi, Matsumoto (JP)

(73) Assignee: Seiko Epson Corporation, Tokyo (JP)

(*) Notice: Subject to any disclaimer, the term of this patent is extended or adjusted under 35 U.S.C. 154(b) by 169 days.

(21) Appl. No.: 17/598,684

(22) PCT Filed: Nov. 29, 2019

(86) PCT No.: PCT/JP2019/046778
§ 371 (c)(1),
(2) Date: Sep. 27, 2021

(87) PCT Pub. No.: WO2020/202639
PCT Pub. Date: Oct. 8, 2020

(65) Prior Publication Data

US 2022/0153045 A1 May 19, 2022

(30) Foreign Application Priority Data

Mar. 29, 2019 (JP) ................................ 2019-065971

(51) Int. Cl.
*B41J 25/304* (2006.01)

(52) U.S. Cl.
CPC .................................. *B41J 25/304* (2013.01)

(58) Field of Classification Search
CPC . B41J 25/304; B41J 19/005; B41J 2/01; B41J 2/175; B41J 2/17509; B41J 29/13
USPC ........................................................... 347/37
See application file for complete search history.

(56) References Cited

U.S. PATENT DOCUMENTS

2015/0035914 A1* 2/2015 Takeuchi ................ B41J 2/175 347/85
2015/0158305 A1* 6/2015 Pujiatno ................ B41J 19/005 347/85

FOREIGN PATENT DOCUMENTS

| | | |
|---|---|---|
| JP | 2013-198992 | 10/2013 |
| JP | 2014-037062 | 2/2014 |
| JP | 2017-052118 | 3/2017 |
| JP | 2017-149130 | 8/2017 |

* cited by examiner

*Primary Examiner* — Matthew Luu
*Assistant Examiner* — Alexander D Shenderov
(74) *Attorney, Agent, or Firm* — WORKMAN NYDEGGER

(57) ABSTRACT

A first ink storage unit, a second ink storage unit, a discharging head configured to discharge the ink, a carriage configured to move the discharging head and the second ink storage unit in a first direction and a second direction, a tube that couples the first ink storage unit and the second ink storage unit, and a case provided with a first opening portion located vertically above a home position and a second opening portion located vertically above a first printing position, and including a beam located between the first opening portion and the second opening portion, are provided. The beam is an edge of the second opening portion, and when the carriage is located at the home position, the first ink storage unit and the second ink storage unit are located in the same direction with respect to the beam and the tube is supported by the beam.

4 Claims, 8 Drawing Sheets

PRINTER

CROSS-REFERENCE TO RELATED APPLICATIONS

The present application is a 371 US Nationalization of International Patent Application No. PCT/JP2019/046778, filed Nov. 29, 2019, which claims priority to JP Patent Application No. 2019-065971, filed Mar. 29, 2019, the entire disclosures of which are incorporated herein by reference.

TECHNICAL FIELD

The present disclosure relates to a printer.

BACKGROUND ART

For example, as in PTL 1, a printer that discharges ink from a recording head, which is an example of a discharging head, and records the ink onto a paper, which is an example of a medium, is known. The printer includes a carriage that moves the recording head, an ink tube, which is an example of a tube, that supplies ink to the recording head from an ink tank, which is an example of a first ink storage unit, and a tube engagement member, which is an example of a beam, that regulates the position of the ink tube.

CITATION LIST

Patent Literature

[PTL 1] JP-A-2013-198992

SUMMARY OF INVENTION

Technical Problem

The tube engaging member is provided across an opening portion that exposes a moving region of the carriage in the direction in which the carriage moves. As a result, when paper jam occurs and the paper is removed from the opening portion, the working space is limited by the tube engagement member.

Solution to Problem

A printer for solving the above-described issue includes a first ink storage unit configured to store ink, a second ink storage unit configured to store the ink supplied from the first ink storage unit, a discharging head configured to discharge the ink toward a medium, a carriage configured to move the discharging head and the second ink storage unit in a first direction and a second direction that is opposite to the first direction, a tube that couples the first ink storage unit and the second ink storage unit, and a case provided with a first opening portion located vertically above the carriage located at a first position and a second opening portion located vertically above the carriage located at a second position, and including a beam located between the first opening portion and the second opening portion. The beam is at least one of an edge of the first opening portion and an edge of the second opening portion, and when the carriage is located at the first position, the first ink storage unit and the second ink storage unit are located in the same direction with respect to the beam and the tube is supported by the beam.

DESCRIPTION OF EMBODIMENTS

Figure 1:
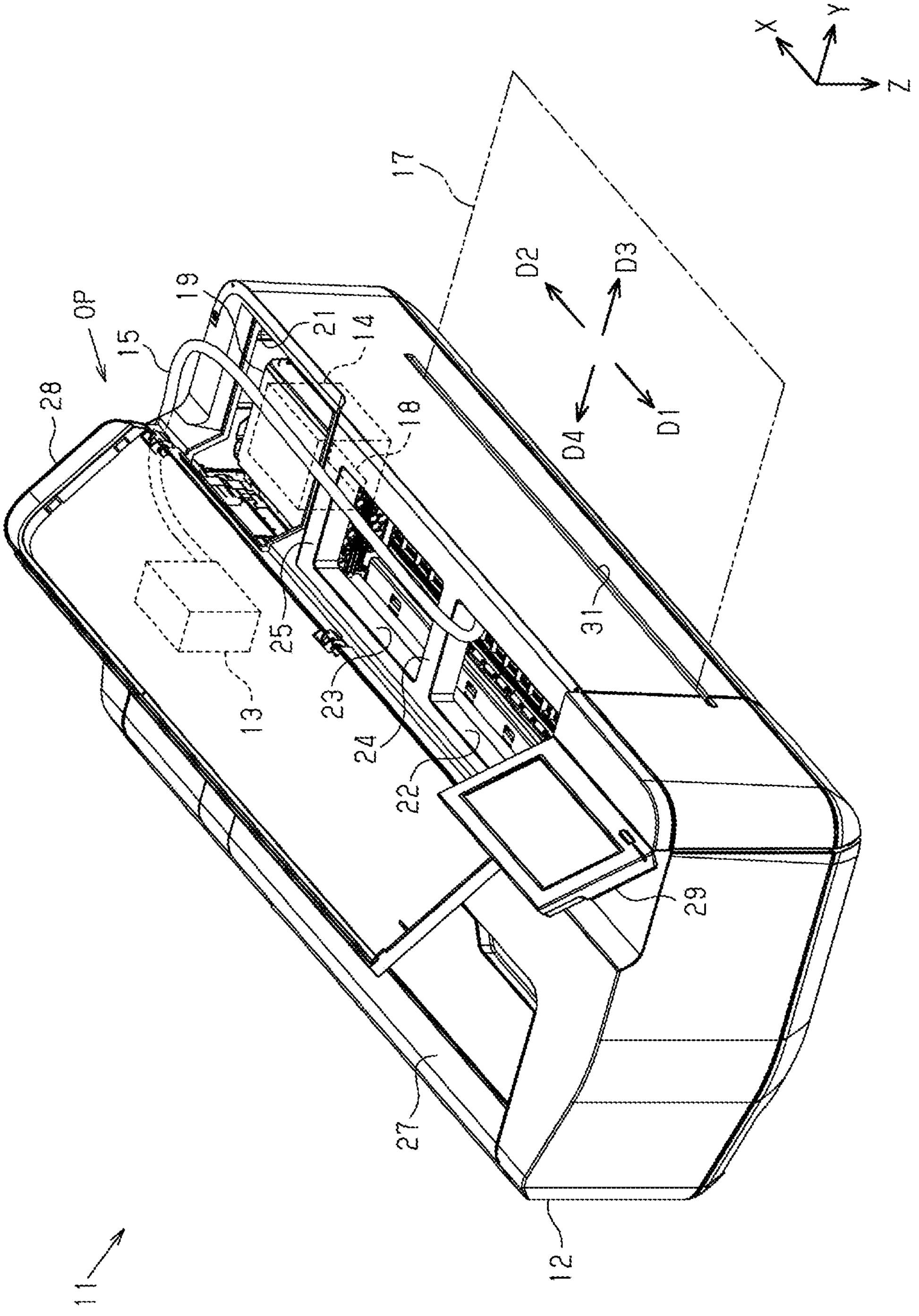
FIG. 1 is a perspective view of an embodiment of a printer.

One exemplary embodiment of a printer will be described below with reference to the accompanying drawings. The printer is, for example, an ink jet-type printer that prints an image such as characters and images on a medium such as a sheet by discharging ink.

In the drawings, the direction of gravity is indicated by a Z-axis while assuming that a printer 11 is placed on a horizontal surface, and directions along a horizontal plane are indicated by an X-axis and a Y-axis. The X-axis, Y-axis, and Z-axis are orthogonal to each other. In the following description, the direction along the X-axis is also referred to as a first direction D1 and a second direction D2 that is opposite to the first direction D1. The direction along the Y-axis is also referred to as a third direction D3 and a fourth direction D4 that is opposite to the third direction D3. The direction along the Z-axis is also referred to as a vertically downward direction and a vertically upward direction that is opposite to the vertical downward direction.

As illustrated in FIG. 1, the printer 11 includes a case 12 having a rectangular parallelepiped form. The printer 11 includes a first ink storage unit 13 configured to store ink, a second ink storage unit 14 configured to store the ink supplied from the first ink storage unit 13, and a tube 15 that couples the first ink storage unit 13 and the second ink storage unit 14. The printer 11 according to the present embodiment is a color printer that includes a plurality of sets of the first ink storage unit 13, the second ink storage unit 14, and the tube 15 and performs printing with a plurality of colors of ink. For ease of illustration, each of the plurality of first ink storage units 13, the plurality of second ink storage units 14, and the plurality of tubes 15 are collectively illustrated in FIG. 1. The printer 11 may be a monochrome printer including a set of the first ink storage unit 13, the second ink storage unit 14, and the tube 15. Note that FIG. 1 does not limit the form of the plurality of tubes 15, and the tubes 15 may have a configuration in which the plurality of tubes 15 are put together, or the plurality of tubes 15 are provided so as to move independently from each other. The plurality of tubes 15 are put together, for example, by partially adhering a part of the tube 15 using an adhesive or by tying a part of the tube 15 using a tying band.

The first ink storage unit 13 is arranged outside the case 12. The first ink storage unit 13 may be arranged on the case 12. The first ink storage unit 13 may be a replaceable cartridge type or a tank type in which ink can be refilled.

The printer 11 includes a discharging head 18 configured to discharge ink toward a medium 17, and a carriage 19 configured to move the discharging head 18 and the second ink storage unit 14 in the first direction D1 and the second direction D2. The second ink storage unit 14, the discharging head 18, and the carriage 19 are provided inside the case 12.

The case 12 is provided with a first opening portion 21, a second opening portion 22, and a third opening portion 23 located between the first opening portion 21 and the second opening portion 22 in the X-axis direction. The case 12 includes a first beam 24, which is an example of a beam, located between the second opening portion 22 and the third opening portion 23 in the X-axis direction, and a second beam 25, which is an example of the beam, located between the first opening portion 21 and the third opening portion 23 in the X-axis direction. In other words, the first beam 24 and the second beam 25 are located between the first opening portion 21 and the second opening portion 22. The first opening portion 21, the second opening portion 22, the third opening portion 23, the first beam 24, and the second beam 25 are located vertically above a movement region in which the carriage 19 can move. The first opening portion 21, the second opening portion 22, the third opening portion 23, the first beam 24, and the second beam 25 overlap the movement region in which the carriage 19 can move, when viewed from the vertical direction.

The case 12 may be provided with a rear cover 27, a front cover 28 located in the third direction D3 from the rear cover 27, and an operating panel 29 located in the first direction D1 from the front cover 28. The rear cover 27, the front cover 28, and the operating panel 29 each have a shaft parallel to the X-axis and are rotatable about the shaft.

The rear cover 27 rotates to a closed position illustrated in FIG. 1 and to an open position (not illustrated). The shaft of the rear cover 27 is located at the end of the rear cover 27 in the fourth direction D4 with the rear cover 27 at the closed position. In a space opened when the rear cover 27 is at the open position, the user can load a roll body R illustrated in FIG. 3 in which the medium 17 is wound in a cylindrical shape.

The front cover 28 can be moved to a cover position (not illustrated) and an open position OP illustrated in FIG. 1, which is different from the cover position. The front cover 28 located at the cover position covers the first opening portion 21 to the third opening portion 23. The front cover 28 located at the open position OP exposes the first opening portion 21 to the third opening portion 23. The shaft of the front cover 28 is located at the end of the front cover 28 in the fourth direction D4 with the front cover 28 at the cover position.

The operating panel 29 rotates about the shaft to a raised position illustrated in FIG. 1 and a tilted position tilted in the fourth direction D4 from the raised position. The shaft of the operating panel 29 is located at the end of the third direction D3 with the operating panel 29 at the tilted position. The operating panel 29 located at the raised position faces the third direction D3.

A discharge port 31 from which the printed medium 17 is discharged is formed on a front surface of the case 12, which is a side surface of the third direction D3. The shape of the discharge port 31 is such that foreign matter from the outside does not easily enter the case 12 while allowing the medium 17 to be discharged. The discharge port 31 according the present embodiment has a slit shape with a small gap in the vertical direction.

Figure 2:
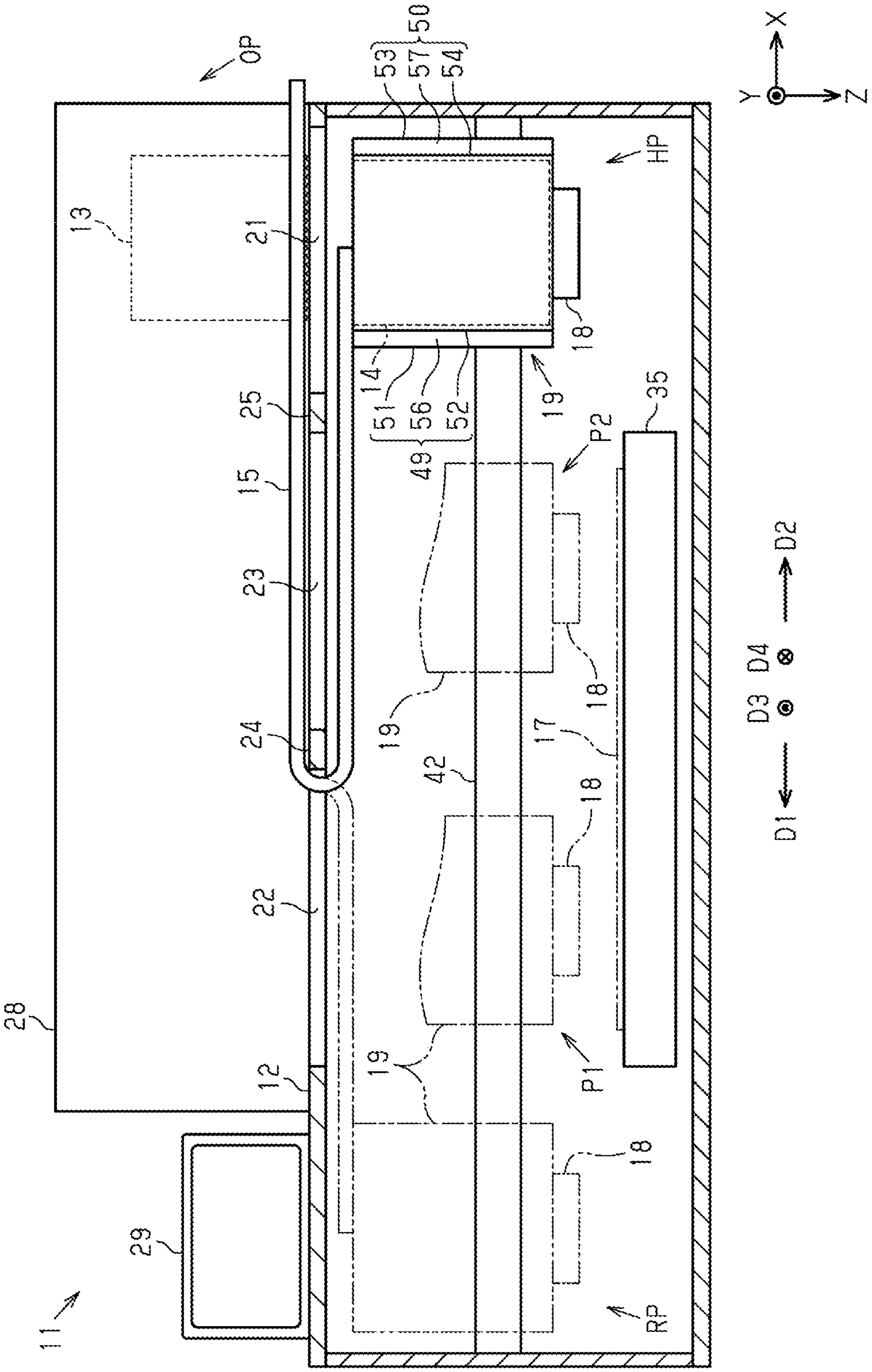
FIG. 2 is a schematic front view illustrating an internal configuration of the printer.

As illustrated in FIG. 2, the carriage 19 moves to a home position HP, which is an example of a first position, a returning position RP, and a printing position between the home position HP and the returning position RP in the second direction D2. In the second direction D2, the returning position RP, the printing position, and the home position HP are arranged in this order. The printing position is a position at which the discharging head 18 that moves together with the carriage 19 prints on the medium 17. In the present embodiment, a position in the discharging head 18 that faces the medium 17 and a position in the medium 17 that can face the discharging head 18 are also referred to as the printing position.

The first opening portion 21 is located vertically above the carriage 19 which is located at the home position HP. The second opening portion 22 is located vertically above the carriage 19 located at a first printing position P1, which is an example of a second position, in the first direction D1 from the first beam 24 in the printing position. The third opening portion 23 is located vertically above the carriage 19 located at a second printing position P2 in the second direction D2 from the first beam 24 in the printing position. In other words, when viewed from the vertical direction, the second opening portion 22 overlaps with the carriage 19 located at the first printing position P1, and the third opening portion 23 overlaps with the carriage 19 located at the second printing position P2.

When the carriage 19 is located at the home position HP, the first ink storage unit 13 and the second ink storage unit 14 are located in the same direction with respect to the first beam 24, and the tube 15 is supported by the first beam 24 and the second beam 25. That is, when the carriage 19 is located at the home position HP, the first ink storage unit 13 and the second ink storage unit 14 are located in the second direction D2 from the first beam 24 and the second beam 25.

At this time, the tube 15 passes vertically above the second beam 25 and vertically above the first beam 24, and curves so as to wrap around the first beam 24, then passes vertically below the first beam 24 and vertically below the second beam 25.

The first beam 24 is an edge of the second opening portion 22 in the second direction D2 and an edge of the third opening portion 23 in the first direction D1. The first beam 24 partitions the second opening portion 22 and the third opening portion 23.

The second beam 25 is an edge of the first opening portion 21 in the first direction D1 and an edge of the third opening portion 23 in the second direction D2. The second beam 25 partitions the first opening portion 21 and the third opening portion 23.

Figure 3:
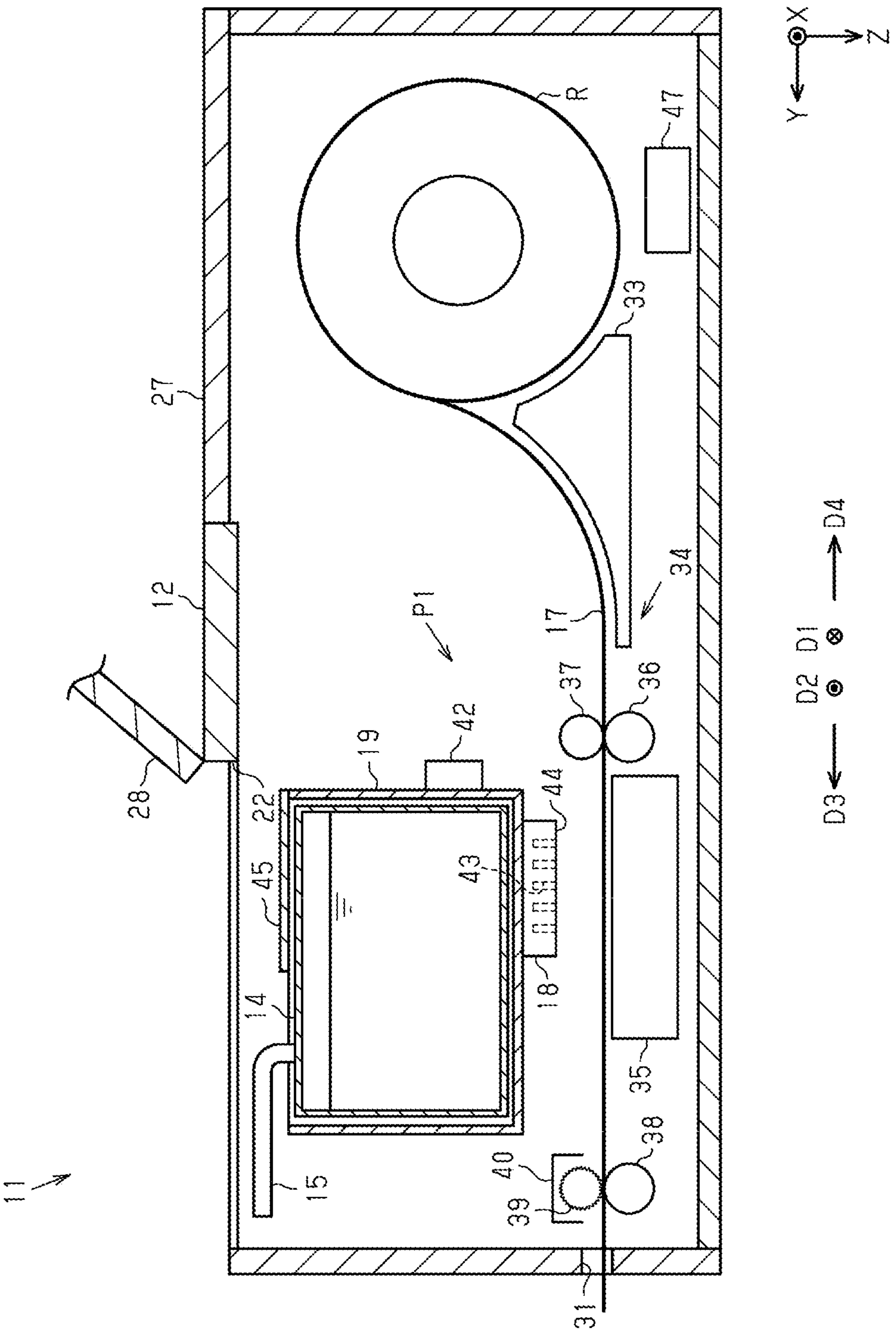
FIG. 3 is a schematic side view illustrating the internal configuration of the printer.

As illustrated in FIG. 3, the printer 11 may include a guide member 33 configured to guide the medium 17 unwound from the roll body R, a transport unit 34 configured to transport the medium 17, and a support 35 configured to support the medium 17 transported by the transport unit 34. The transport unit 34 transports the medium 17 unwound from the roll body R downstream in a transport direction. In the present embodiment, the transport direction is a direction in which the medium 17 is transported along members included in the printer 11, such as the guide member 33 and the support 35. The transport unit 34 includes a transport driving roller 36 and a transport driven roller 37 provided between the guide member 33 and the support 35 in the transport direction, and a discharge driving roller 38 and a star wheel 39 provided between the support 35 and the discharge port 31 in the transport direction. The printer 11 may include a wheel cover 40 that covers vertically above the star wheel 39.

The transport driving roller 36 transports the medium 17 by rotating in a state in which the medium 17 is sandwiched between transport driving roller 36 and the transport driven roller 37. The discharge driving roller 38 rotates in a state in which the medium 17 is sandwiched between the discharge driving roller 38 and the star wheel 39, thereby discharging the medium 17 from the discharge port 31.

The printer 11 includes a guide shaft 42 that supports the carriage 19. The discharging head 18 is mounted on the carriage 19 in a posture in which a nozzle surface 44 on which a nozzle 43 is formed faces the support 35 or the medium 17 supported by the support 35. The carriage 19 is reciprocally movable along the guide shaft 42. The printer 11 may include a lid member 45 provided on the carriage 19 to be opened and closed.

The discharging head 18 discharges ink from vertically above toward the medium 17 located at the printing position to print. Therefore, a vertically upper surface of the medium 17 is printed. The star wheel 39 is configured to come into contact with the vertically upper surface of the medium 17 on which the ink is discharged. The star wheel 39 has a plurality of protrusions formed on a circumferential surface of the wheel, and the protrusions come into contact with the medium 17. Therefore, the contact area between the star wheel 39 and the medium 17 is smaller than the contact area between the columnar transport driven roller 37 and the medium 17, thus deterioration of the quality of the image printed on the medium 17 can be reduced.

The transport unit 34 transports the medium 17 unwound from the roll body R downstream in the transport direction, and discharges the medium 17 from the discharge port 31 in a discharge direction. The discharge port 31 is located in the third direction D3 from the printing position at which the discharging head 18 prints on the medium 17. The transport unit 34 transports the medium 17 located at the printing position in the third direction D3, and discharges the medium 17 from the discharge port 31 toward the third direction D3. In other words, the transport direction and the discharge direction at the printing position coincide with the third direction D3. The star wheel 39 is located in the third direction D3 from the nozzle surface 44.

The printer 11 includes a control unit 47 that comprehensively controls the drive of each mechanism in the printer 11. The control unit 47 is configured by a processing circuit and the like including a computer and a memory, for example. The control unit 47 controls various operations executed by the printer 11 in accordance with a program stored in the memory.

Figure 4:
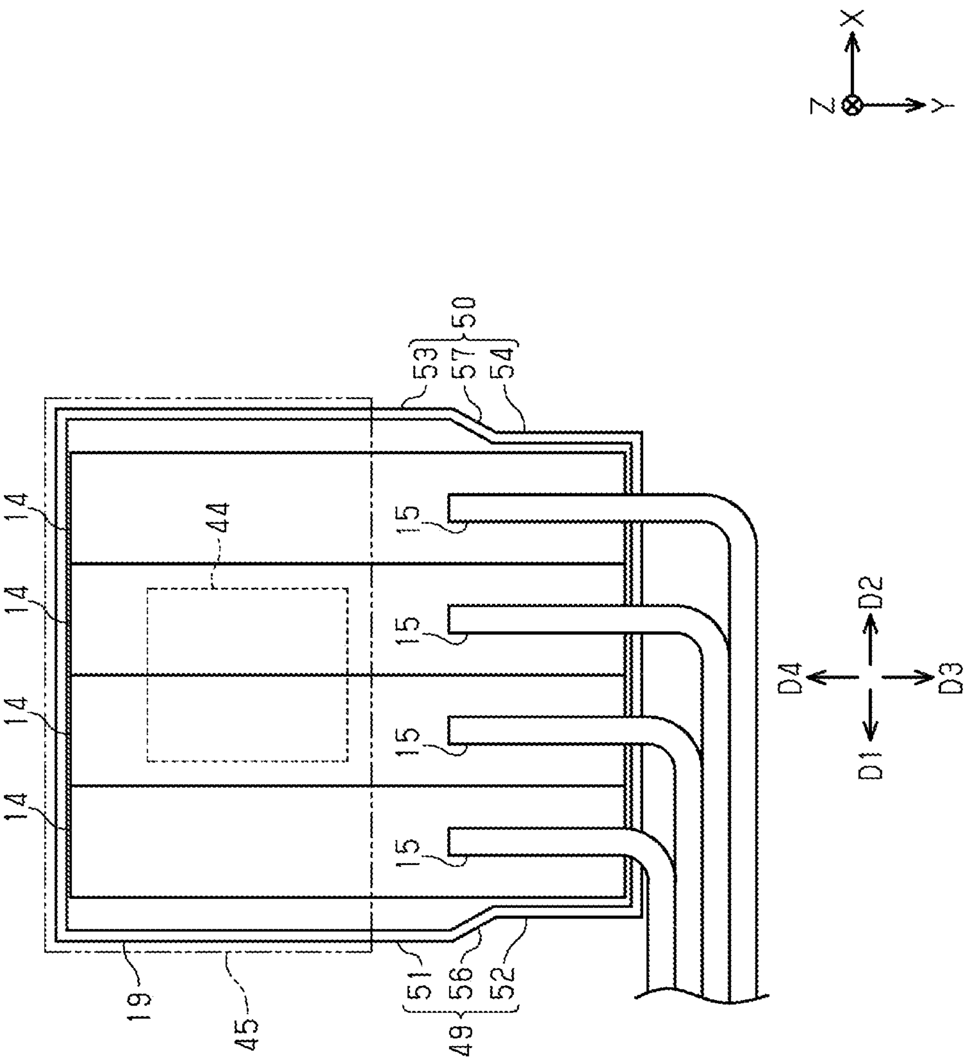
FIG. 4 is a schematic plan view of a carriage.

As illustrated in FIG. 4, the carriage 19 includes a first side wall 49, which is an example of a side wall, located in the first direction D1 from the second ink storage unit 14, and a second side wall 50 located in the second direction D2 from the second ink storage unit 14.

The first side wall 49 has a first outer wall surface 51, and a second outer wall surface 52 located in the third direction D3 from the first outer wall surface 51. The second side wall 50 has a third outer wall surface 53, and a fourth outer wall surface 54 located in the third direction D3 from the third outer wall surface 53. The first outer wall surface 51 is located in the first direction D1 from the second outer wall surface 52. The third outer wall surface 53 is located in the second direction D2 from the fourth outer wall surface 54. That is, the first outer wall surface 51 is located at outer side than the second outer wall surface 52, and is located at a position farther away from the second ink storage unit 14 than the second outer wall surface 52 in the first direction D1. The third outer wall surface 53 is located at outer side than the fourth outer wall surface 54, and is located at a position farther away from the second ink storage unit 14 than the fourth outer wall surface 54 in the second direction D2. In the first direction D1, a distance between the first outer wall surface 51 and the third outer wall surface 53 is larger than a distance between the second outer wall surface 52 and the fourth outer wall surface 54.

The first side wall 49 has a first inclined surface 56, which is an example of an inclined surface, located between the first outer wall surface 51 and the second outer wall surface 52 and faces the first direction D1 and the third direction D3. Facing the first direction D1 and the third direction D3 means that the direction orthogonal to the first inclined surface 56 toward the outside of the carriage 19 includes components of the first direction D1 and the third direction D3. The second side wall 50 has a second inclined surface 57 located between the third outer wall surface 53 and the fourth outer wall surface 54 and faces the second direction D2 and the third direction D3.

The nozzle surface 44 included in the discharging head 18 is located in the fourth direction D4 from the second outer wall surface 52 and the fourth outer wall surface 54. The first inclined surface 56 and the second inclined surface 57 are located in the third direction D3 from the nozzle surface 44.

Next, actions of the present embodiment will be described.

As illustrated by the solid line in FIG. 2, the carriage 19 is located at the home position HP in the standby state in which printing is not performed.

When printing is performed, the control unit 47 moves the carriage 19 located at the home position HP in the first direction D1. When the carriage 19 located at the home position HP moves in the first direction D1 so as to approach the first beam 24, the tube 15 may hang down due to its own weight. The carriage 19 moving in the first direction D1 moves while pushing the tube 15 in the third direction D3 by the first inclined surface 56.

As illustrated in FIG. 3, the star wheel 39 located in the third direction D3 from the carriage 19 and vertically below the carriage 19 is covered vertically upward with the wheel cover 40. Therefore, the tube 15 hanging down is supported by the wheel cover 40, and contact with the star wheel 39 is suppressed.

As illustrated by the two-dot chain line in FIG. 2, the tube 15 is supported by the first beam 24 and the second beam 25 while the carriage 19 moves. When the carriage 19 moves to the returning position RP, the control unit 47 suspends the carriage 19 and then moves the carriage 19 in the second direction D2.

When the carriage 19 located at the returning position RP moves in the second direction D2 so as to approach the first beam 24, the tube 15 may hang down due to its own weight. The carriage 19 moving in the first direction D2 moves while pushing the tube 15 in the third direction D3 by the second inclined surface 57.

The first beam 24 is provided over the third direction D3, and partitions the second opening portion 22 and the third opening portion 23 in the first direction D1. At the printing position, for example, when the medium 17 is clogged, the medium 17 can be removed through the second opening portion 22 and the third opening portion 23.

Effects of the present embodiment will now be described.

(1) The case 12 includes the first opening portion 21, the second opening portion 22, and the first beam 24. The first opening portion 21 and the second opening portion 22 are located at different positions in the first direction D1 in which the carriage 19 moves. The first beam 24 is located between the first opening portion 21 and the second opening portion 22 in the first direction D1 and is at least one of the edge of the first opening portion 21 and the edge of the second opening portion 22. Therefore, as compared with the case where the beam is provided over the first direction D1, a range in which the first beam 24 is located in the first direction D1 can be reduced, and operations through the first opening portion 21 or the second opening portion 22 can be performed easily.

(2) When the tube 15 is bent, the supply of ink may be hindered. In that respect, when the carriage 19 that moves in the first direction D1 and the second direction D2 under the first beam 24 is located at the home position HP, the tube 15 passes vertically above and vertically below the first beam 24. Therefore, the tube 15 can be curved so as to be wound around the first beam 24. Accordingly, since the first beam 24 is located inside the curved tube 15, the tube 15 can be prevented from being bent.

(3) In the first side wall 49 of the carriage 19, the first outer wall surface 51 located in the fourth direction D4 projects more outward than the second outer wall surface 52 located in the third direction D3. Therefore, the nozzle surface 44 located in the fourth direction D4 from the second outer wall surface 52 can be protected by the first outer wall surface 51.

(4) The first side wall 49 includes the first inclined surface 56 located between the first outer wall surface 51 and the second outer wall surface 52. Therefore, for example, even when the tube 15 bends and contacts the first side wall 49, the carriage 19 moving in the first direction D1 pushes the tube 15 in the third direction D3 by the first inclined surface 56. Therefore, the tube 15 can be kept away from the nozzle surface 44, and the tube 15 and the nozzle surface 44 can be prevented from coming into contact with each other.

(5) The star wheel 39 is covered with the wheel cover 40. Therefore, the tube 15 pushed by the first inclined surface 56 in the third direction D3 can be prevented from coming into contact with the star wheel 39 located in the third direction D3.

The present exemplary embodiment described above may be modified as follows. The present exemplary embodiment and modified examples thereof to be described below may be implemented in combination within a range in which a technical contradiction does not arise.

Figure 5:
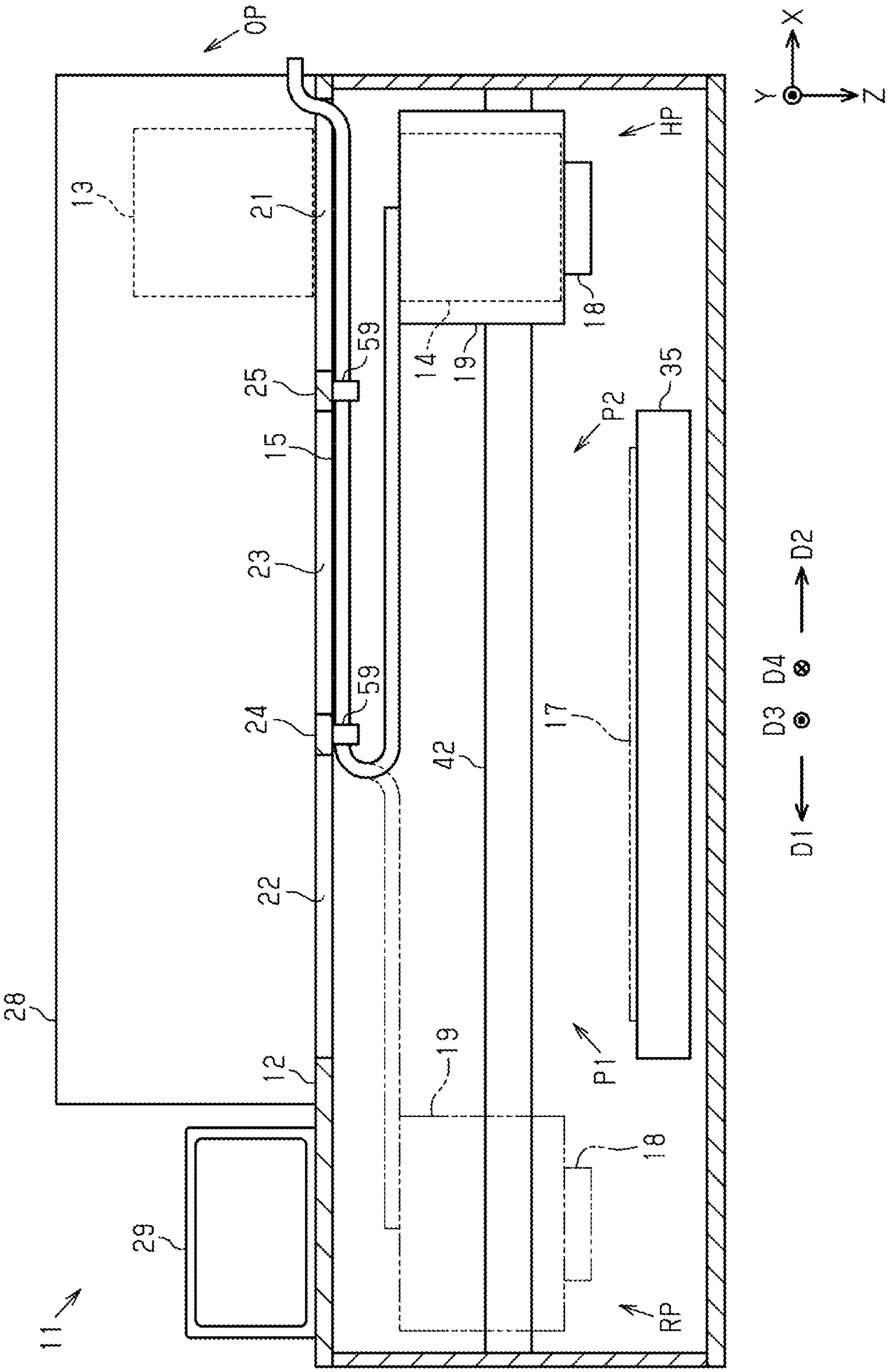
FIG. 5 is a schematic front view illustrating an internal configuration of a modified example of the printer.

As illustrated in FIG. 5, the tube 15 may be configured to pass vertically below the first beam 24 when the carriage 19 is located at the home position HP. The printer 11 may include, for example, a fixing member 59 such as an adhesive tape or a wire, and a portion of the tube 15 passing vertically below the first beam 24 may be fixed to the first beam 24 by the fixing member 59. For example, when the tube 15 is sandwiched between a falling object and the first beam 24, the tube 15 may be crushed and the ink supply may be hindered. In that respect, the portion of the tube 15 passing vertically below the first beam 24 is fixed to the first beam 24. That is, since the tube 15 passes vertically below the first beam 24, the tube 15 can be prevented from crushing as compared with the case where the tube 15 passes vertically above the first beam 24.

As illustrated in FIG. 5, the tube 15 may be configured to pass vertically below the first beam 24 and the second beam 25. A portion of the tube 15 passing vertically below the second beam 25 may be fixed to the second beam 25 by the fixing member 59.

Figure 6:
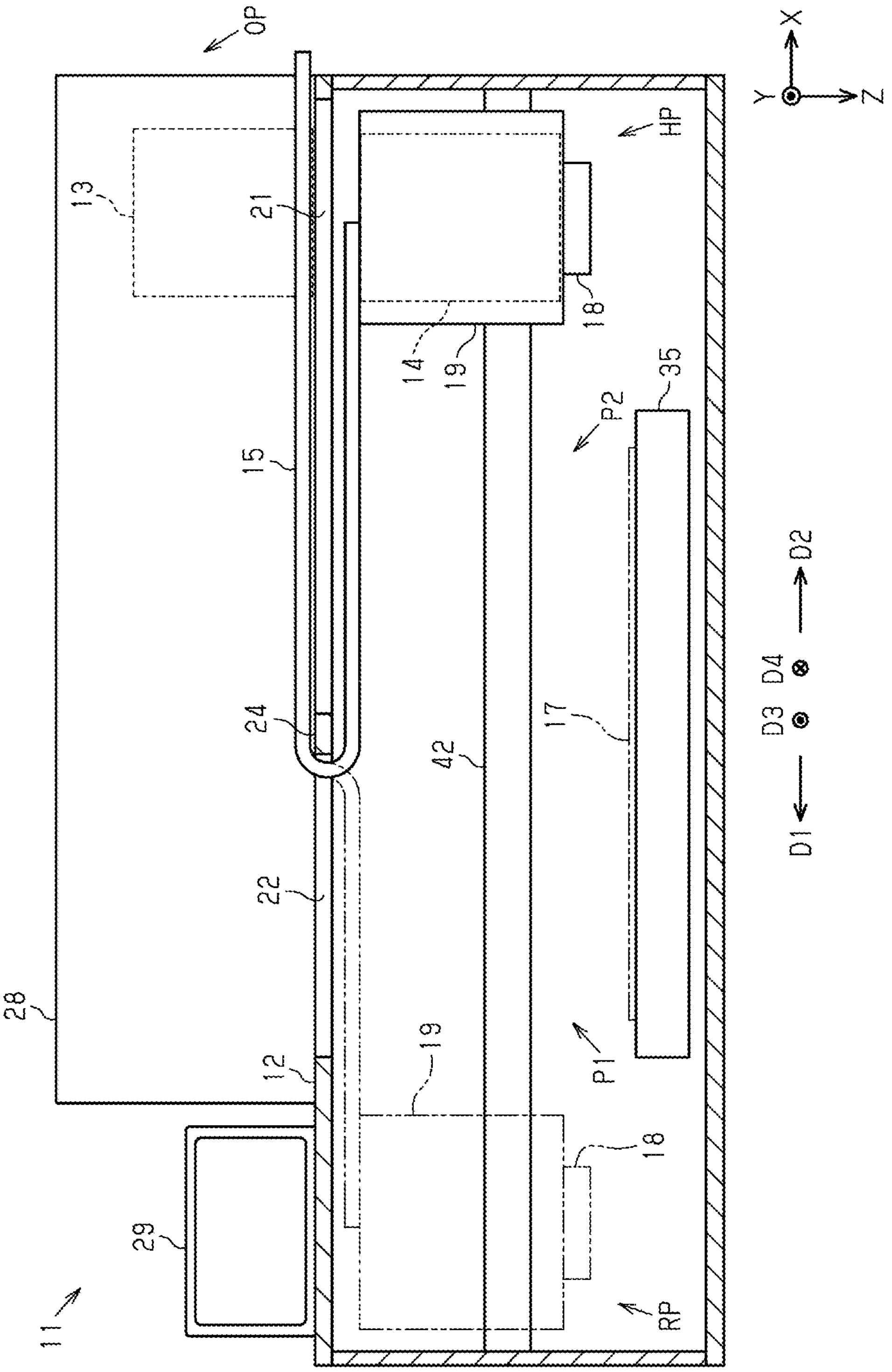
FIG. 6 is a schematic front view illustrating an internal configuration of a modified example of the printer.

As illustrated in FIG. 6, the case 12 may not include the third opening portion 23 and the second beam 25, and the first beam 24 may be the edge of both the first opening portion 21 and the second opening portion 22.

Figure 7:
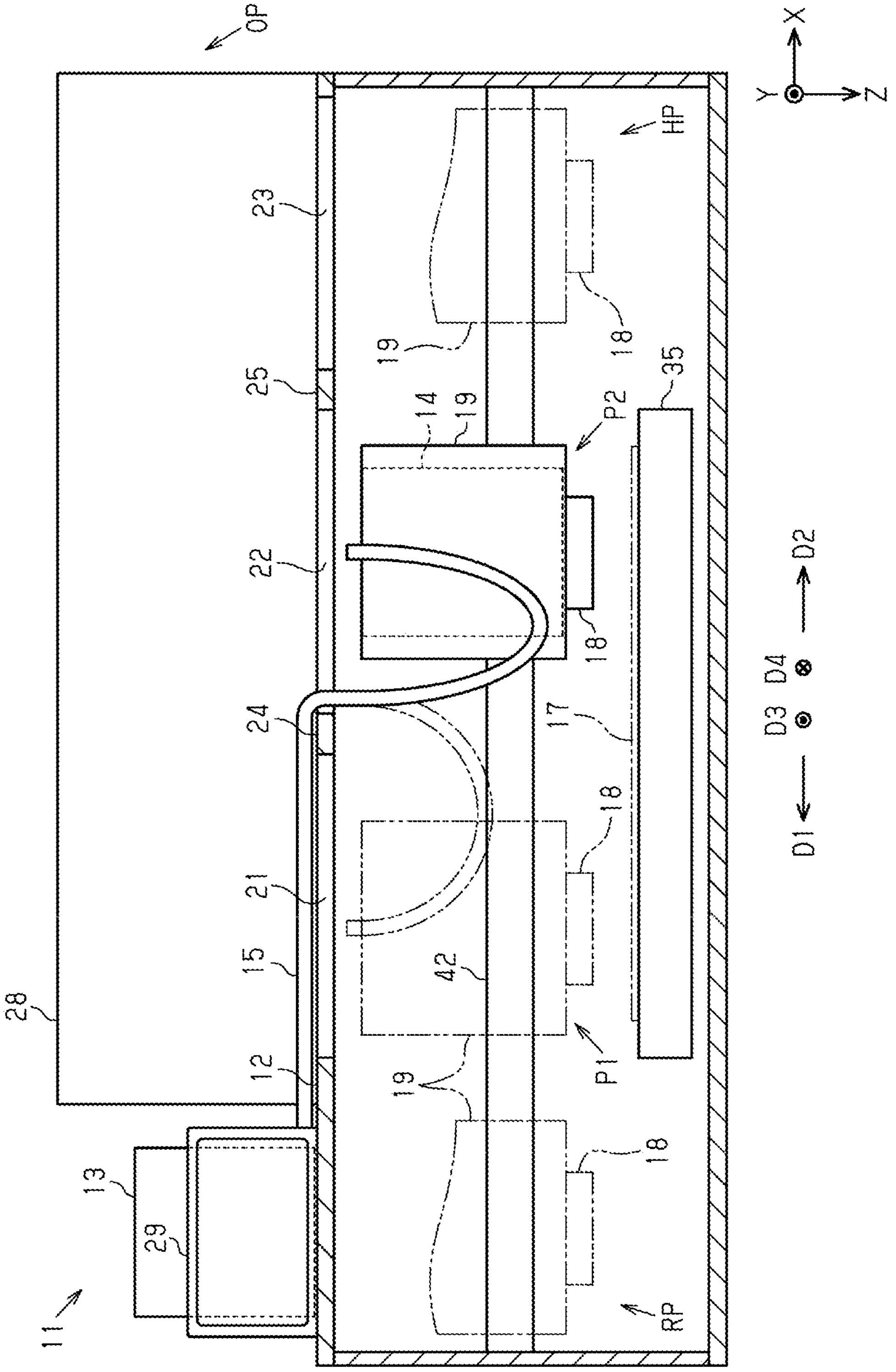
FIG. 7 is a schematic front view illustrating an internal configuration of a modified example of the printer.

As illustrated in FIG. 7, the first ink storage unit 13 may be provided in the first direction D1 from the first beam 24. In the printing position, the position of the first direction D1 from the first beam 24 may be the first printing position P1 which is an example of the first position, and the position of the second direction D2 from the first beam 24 may be the second printing position P2 which is an example of the second position. When the carriage 19 is located at the first printing position P1, the carriage 19 is located in the first direction D1 from the first ink storage unit 13, the second ink storage unit 14, and the first beam 24. The case 12 may include the first opening portion 21 located vertically above the carriage 19 located at the first printing position P1, the second opening portion 22 located vertically above the carriage 19 located at the second printing position P2, and the third opening portion 23 located vertically above the carriage 19 located at the home position HP. The first beam 24 may be the edge of the first opening portion 21 and the second opening portion 22, and the second beam 25 may be the edge of the second opening portion 22 and the third opening portion 23.

Figure 8:
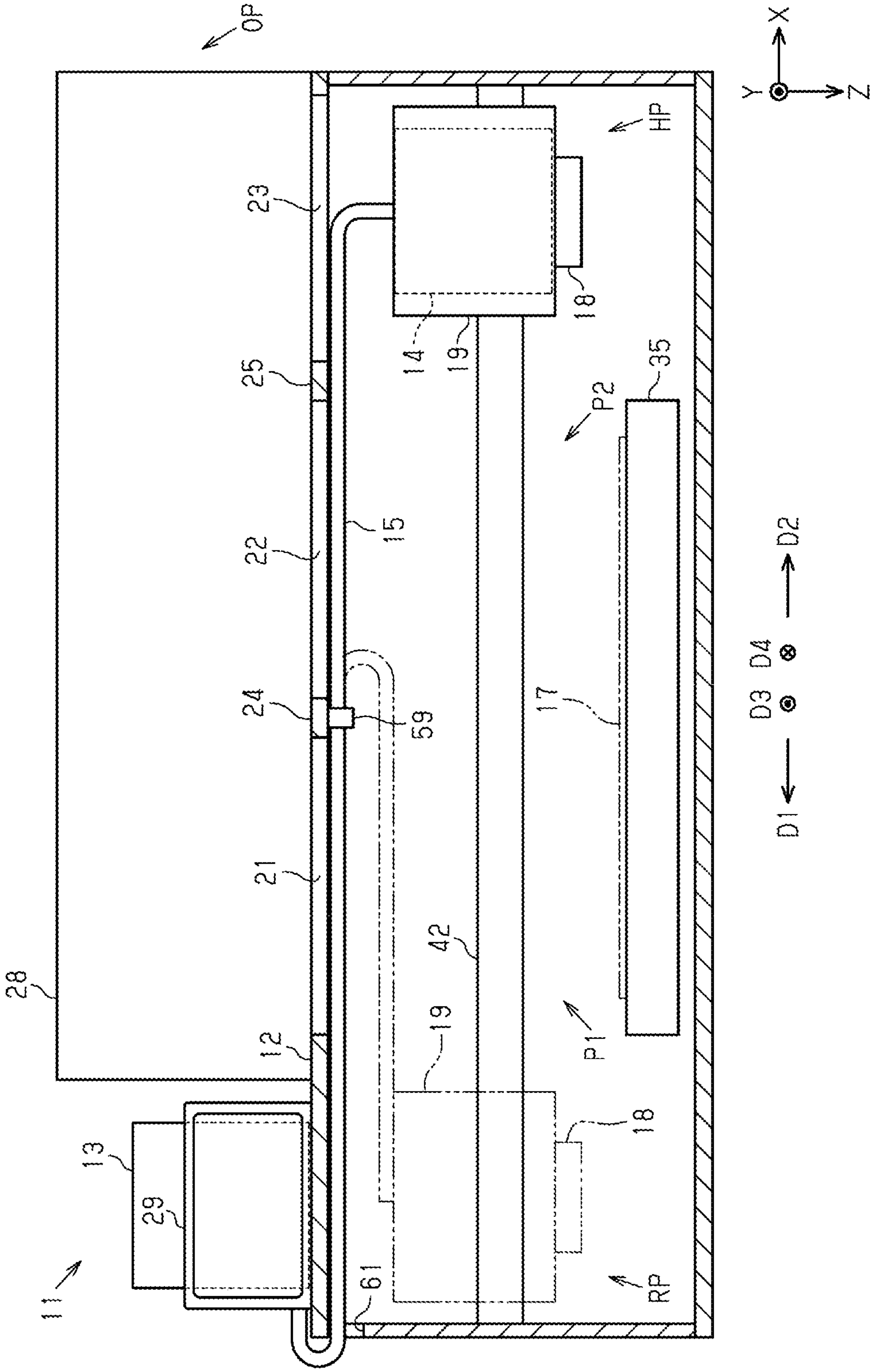
FIG. 8 is a schematic front view illustrating an internal configuration of a modified example of the printer.

As illustrated in FIG. 8, the tube 15 may be configured to pass through the case 12 from a portion different from the first opening portion 21 to the third opening portion 23. For example, the tube 15 may pass through the case 12 through a communication hole 61 formed in the side wall of the case 12.

The first opening portion 21 to the third opening portion 23 are not limited to a rectangular shape in plan view, and may be circular or elliptical. The width of the first beam 24 and the second beam 25 in the first direction D1 may differ between the center and the end thereof in the third direction D3.

The printer 11 may include a support member that supports the tube 15, and may be configured to suppress hanging of the tube 15 by the support member to suppress the contact between the star wheel 39 and the tube 15.

The first inclined surface 56 and the second inclined surface 57 may be surfaces orthogonal to the third direction D3.

In the carriage 19, at least one of the first side wall 49 and the second side wall 50 may be flat. That is, the first side wall 49 may be a member in which the first outer wall surface 51 and the second outer wall surface 52 are located at the same position in the first direction D1. The second side wall 50 may be a member in which the third outer wall surface 53 and the fourth outer wall surface 54 are located at the same position in the second direction D2.

A rib may be formed on at least one of the first side wall 49 and the second side wall 50. When the rib is formed, the strength is increased, and the member on which the ribs are formed can be prevented from deforming. The rib may be formed, for example, so that a plurality of linear ribs are arranged parallel to each other, or may be formed in a grid pattern. When forming ribs, the first outer wall surface 51, the second outer wall surface 52, the third outer wall surface 53, and the fourth outer wall surface 54 are virtual surfaces that include vertices of the plurality of ribs protruding in a direction away from the second ink storage unit 14.

That is, the first outer wall surface 51, the second outer wall surface 52, the third outer wall surface 53, and the fourth outer wall surface 54 are the virtual surfaces in a state where the gaps between the ribs are filled.

In the third direction D3, the nozzle surface 44 may be located at the same position as the second outer wall surface

52 and the fourth outer wall surface 54. In the third direction D3, the nozzle surface 44 may be located at the same position as the first inclined surface 56 and the second inclined surface 57.

Hereinafter, technical concepts and effects thereof that are understood from the above-described exemplary embodiments and modified examples will be described.

(A) The printer includes the first ink storage unit configured to store the ink, the second ink storage unit configured to store the ink supplied from the first ink storage unit, the discharging head configured to discharge the ink toward the medium, the carriage configured to move the discharging head and the second ink storage unit in the first direction and the second direction that is opposite to the first direction, the tube that couples the first ink storage unit and the second ink storage unit, and the case provided with the first opening portion located vertically above the carriage located at the first position and the second opening portion located vertically above the carriage located at the second position, and including the beam located between the first opening portion and the second opening portion. The beam is at least one of the edge of the first opening portion and the edge of the second opening portion, and when the carriage is located at the first position, the first ink storage unit and the second ink storage unit are located in the same direction with respect to the beam and the tube is supported by the beam.

According to this configuration, the case has the first opening portion, the second opening portion, and the beam. The first opening portion and the second opening portion are located at different positions in the first direction in which the carriage moves. The first beam is located between the first opening portion and the second opening portion in the first direction and is at least one edge of the first opening portion and the second opening portion. Therefore, as compared with the case where the beam is provided over the first direction, a range in which the first beam is located in the first direction can be reduced, and operations through the first opening portion or the second opening portion can be performed easily.

(B) In the printer, when the carriage is located at the first position, the tube may pass vertically above the beam and vertically below the beam.

When the tube is bent, the supply of ink may be hindered. In that respect, according to this configuration, when the carriage that moves in the first direction and the second direction under the beam is located at the first position, the tube passes vertically above and vertically below the beam. Therefore, the tube can be curved so as to be wound around the beam. Accordingly, since the beam is located inside the curved tube, the tube can be prevented from being bent.

(C) In the printer, when the carriage is located at the first position, a portion of the tube passing vertically below the beam may be fixed to the beam.

For example, when the tube is sandwiched between a falling object and the first beam, the tube may be crushed and the ink supply may be hindered. In that respect, according to this configuration, the portion of the tube passing vertically below the beam is fixed to the beam. That is, since the tube can be passed vertically below the beam, the tube can be prevented from crushing as compared with the case where the tube passes vertically above the beam.

(D) In the printer, the carriage may include the side wall located in the first direction from the second ink storage unit, the side wall may have the first outer wall surface, and the second outer wall surface located in the third direction from the first outer wall surface, the first outer wall surface may be located in the first direction from the second outer wall surface, and the nozzle surface included in the discharging head may be located in the fourth direction that is opposite to the third direction from the second outer wall surface.

According to this configuration, the side wall included in the carriage, the first outer wall surface located in the fourth direction projects more outward than the second outer wall surface located in the third direction. Therefore, the nozzle surface located in the fourth direction from the second outer wall surface can be protected by the first outer wall surface.

(E) In the printer, the first side wall may have the inclined surface that is located between the first outer wall surface and the second outer wall surface and faces the first direction and the third direction, and the inclined surface may be located in the third direction from the nozzle surface.

According to this configuration, the side wall includes the inclined surface located between the first outer wall surface and the second outer wall surface. Therefore, for example, even when the tube bends and contacts the side wall, the carriage moving in the first direction pushes the tube in the third direction by the inclined surface. As a result, the tube can be kept away from the nozzle surface, and the tube and the nozzle surface can be prevented from coming into contact with each other.

(F) The printer may include the star wheel configured to come into contact with the vertically upper surface of the medium on which the ink is discharged, and the wheel cover that covers vertically above the star wheel, and the star wheel may be located in the third direction from the nozzle surface.

According to this configuration, the star wheel is covered with the wheel cover. Therefore, the tube pushed by the inclined surface in the third direction can be prevented from coming into contact with the star wheel located in the third direction.

REFERENCE SIGNS LIST

1 . . . Printer, 12 . . . Case, 13 . . . First ink storage unit, 14 . . . Second ink storage unit, 15 . . . Tube, 17 . . . Medium, 18 . . . Discharging head, 19 . . . Carriage, 21 . . . First opening portion, 22 . . . Second opening portion, 23 . . . Third opening portion, 24 . . . First beam, 25 . . . Second beam, 27 . . . Rear cover, 28 . . . Front cover, 29 . . . Operating panel, 31 . . . Discharge port, 33 . . . Guide member, 34 . . . Transport unit, 35 . . . Support, 36 . . . Transport driving roller, 37 . . . Transport driven roller, 38 . . . Discharge driving roller, 39 . . . Star wheel, 40 . . . Wheel cover, 42 . . . Guide shaft, 43 . . . Nozzle, 44 . . . Nozzle surface, 45 . . . Lid member, 47 . . . Control unit, 49 . . . First side wall, 50 . . . Second side wall, 51 . . . First outer wall surface, 52 . . . Second outer wall surface, 53 . . . Third outer wall surface, 54 . . . Fourth outer wall surface, 56 . . . First inclined surface, 57 . . . Second inclined surface, 59 . . . Fixing member, 61 . . . Communication hole, D1 . . . First direction, D2 . . . Second direction, D3 . . . Third direction, D4 . . . Fourth direction, HP . . . Home position, OP . . . Opening position, P1 . . . First printing position, P2 . . . Second printing position, R . . . Roll body, RP . . . Returning position

The invention claimed is:

1. A printer comprising:

a first ink storage unit configured to store ink, a second ink storage unit configured to store the ink supplied from the first ink storage unit, a discharging head configured to discharge the ink toward a medium, a carriage configured to move the discharging head and the second ink storage unit in a first direction and a second direction that is opposite to the first direction, a tube that couples the first ink storage unit and the second ink storage unit, and a case provided with a first opening portion located vertically above the carriage located at a first position and a second opening portion located vertically above the carriage located at a second position, and including a beam located between the first opening portion and the second opening portion, wherein the beam is at least one of an edge of the first opening portion and an edge of the second opening portion, when the carriage is located at the first position, the first ink storage unit and the second ink storage unit are located in the same direction with respect to the beam and the tube is supported by the beam, the carriage includes a side wall located in the first direction from the second ink storage unit, the side wall has a first outer wall surface, and a second outer wall surface located in a third direction from the first outer wall surface, the first outer wall surface is located in the first direction from the second outer wall surface, a nozzle surface included in the discharging head is located in a fourth direction that is opposite to the third direction from the second outer wall surface, the first side wall has an inclined surface that is located between the first outer wall surface and the second outer wall surface and faces the first direction and the third direction, and the inclined surface is located in the third direction from the nozzle surface.

2. The printer according to claim 1, wherein when the carriage is located at the first position, the tube passes vertically above the beam and vertically below the beam.

3. The printer according to claim 1, wherein when the carriage is located at the first position, a portion of the tube passing vertically below the beam is fixed to the beam.

4. The printer according to claim 1, comprising:

a star wheel configured to come into contact with a vertically upper surface of the medium on which the ink is discharged, and a wheel cover that covers vertically above the star wheel, wherein the star wheel is located in the third direction from the nozzle surface.

* * * * *